(12) United States Patent
Kaufhold et al.

(10) Patent No.: US 6,410,638 B1
(45) Date of Patent: Jun. 25, 2002

(54) ALIPHATIC, SINTERABLE, THERMOPLASTIC POLYURETHANE MOLDING COMPOSITIONS

(75) Inventors: Wolfgang Kaufhold, Köln; Hans-Georg Hoppe, Leichlingen; Rainer Ohlinger, Hannover; Jürgen Bühring, Burgwedel, all of (DE)

(73) Assignees: Bayer Aktiengesellschaft, Leverkusen; Benecke-Kaliko Aktiengesellschaft, Hannover, both of (DE)

( * ) Notice: Subject to any disclaimer, the term of this patent is extended or adjusted under 35 U.S.C. 154(b) by 0 days.

(21) Appl. No.: 09/558,910

(22) Filed: Apr. 26, 2000

(30) Foreign Application Priority Data

May 4, 1999 (DE) .......................................... 199 20 367

(51) Int. Cl.$^7$ ................................................ C08J 83/00
(52) U.S. Cl. .................... 524/507; 524/513; 524/515; 524/521; 524/522; 524/565
(58) Field of Search ................................ 524/507, 513, 524/515, 521, 522, 565

(56) References Cited

U.S. PATENT DOCUMENTS

| | | | | |
|---|---|---|---|---|
| 3,049,505 A | | 8/1962 | Grabowski et al. ........ 260/45.4 |
| 3,541,183 A | | 11/1970 | Kallert et al. ................ 260/858 |
| 4,317,890 A | | 3/1982 | Goyert et al. .................. 525/66 |
| 4,410,595 A | * | 10/1983 | Matsumoto et al. ........ 428/412 |
| 4,500,671 A | | 2/1985 | Goyert et al. ................ 524/494 |
| 5,216,062 A | * | 6/1993 | Lausberg et al. ............ 524/104 |
| 5,218,058 A | * | 6/1993 | Zeitler et al. ................ 524/404 |
| 5,237,001 A | * | 8/1993 | Piejko et al. .................. 525/66 |
| 5,541,277 A | | 7/1996 | Muhlfeld et al. .............. 528/28 |
| 6,037,409 A | | 3/2000 | Schmid et al. ................. 525/66 |

FOREIGN PATENT DOCUMENTS

| | | |
|---|---|---|
| DE | 2901774 | 7/1980 |
| DE | 3932923 | 4/1991 |
| EP | 0 418 686 | 3/1991 |
| GB | 1197844 | 2/1968 |
| GB | 2 021 600 | 12/1979 |

* cited by examiner

Primary Examiner—David W. Wu
Assistant Examiner—William K Cheung
(74) Attorney, Agent, or Firm—Joseph C. Gil; Aron Pries; James R. Franks

(57) ABSTRACT

A light-stable, sinterable particulate thermoplastic molding composition is described. The thermoplastic compositions of the present invention consist essentially of: (i) a resinous blend of, (a) thermoplastic polyurethane, and (b) a member selected from at least one of a number of recited copolymers, e.g., a styrene-acrylonitrile copolymer; (ii) a UV stabilizer; and (iii) an antioxidant. The thermoplastic polyurethane (a) is prepared from an aliphatic or cycloaliphatic diisocyanate. The molding compositions are suitable for the preparation of textured sintered films, e.g., by the powder-slush process, having improved tactile properties that, for example, may be used in the fabrication of vehicle interior trim components and vehicle air bags.

16 Claims, No Drawings

ALIPHATIC, SINTERABLE, THERMOPLASTIC POLYURETHANE MOLDING COMPOSITIONS

CROSS REFERENCE TO RELATED PATENT APPLICATIONS

The present patent application claims the right of priority under 35 U.S.C. §119(a)–(d) German Patent Application No. 199 20 367.9, filed May 4, 1999.

FIELD OF THE INVENTION

The invention relates to light-stable, sinterable, thermoplastic polyurethane moulding compositions with reduced mechanical strength, improved tactile properties and improved write sensitivity, which can be processed by the powder-slush process. The moulding compositions according to the invention are particularly suitable for the production of textured sintered films for the interior trim of means of transport, particularly as a cover for airbags in motor vehicles.

BACKGROUND OF THE INVENTION

Aliphatic thermoplastic polyurethanes (TPU) for use in the interior trim of motor vehicles, e.g. in the trim of instrument panels, are already described, for example, in DE-C-42 03 307. Naturally, there is a desire to achieve a uniform appearance of the overall trim and, therefore, to produce said trim from a single material. The problem arises, however, that the common aliphatic thermoplastic polyurethanes with good light fastness and thermal stability are not suitable as a cover for airbags because of their outstanding mechanical properties, particularly the high ultimate tensile strength, particularly if the passenger airbag is designed as an invisible, integral component of the instrument panel.

A process for the preparation of crosslinked polyurethanes from diisocyanate and low molecular weight chain extender containing at least two hydrogen atoms reacting with isocyanate groups, for example, butane 1,4-diol and from relatively high molecular weight, linear polyhydroxyl compounds is described in DE-AS 16 94 135, which contain a mixture of 70 to 90 wt. % of hexane diol polycarbonate which was prepared by reaction of hexane 1,6-diot and diary carbonates, and of 10 to 30 wt. % of mixed polyester of, i.a., hexane 1,6-diol and 2,2'-dimethyl-1,3-propane diol. The crosslinking of the polyurethanes is achieved by the use of diisocyanates in excess. In polyurethane elastomers prepared from these starting materials, the high resistance to hydrolysis due to the polycarbonate remains intact. Moreover, such elastomers also exhibit, however,improved low temperature resistance and processability compared with elastomers for whose preparation the polyol component used was pure hexane 1,6-diol polycarbonate. The better processability becomes effective particularly in the liquid phase—for example in the casting process—since the polyester-polycarbonate mixtures used have a lower viscosity at the processing temperatures than the pure hexane diol polycarbonate, which is why the resulting film can more easily be cast bubble-free. The products produced according to this process may be used in mechanical engineering and vehicle production.

A polyurethane moulding compound which can be melt processed in the form of sintered powder for the production of textured sintered films is described in DE-C-42 03 307, wherein the powder is composed solely of linear aliphatic components. The polyol component is composed of 60 to 80 parts by weight of an aliphatic polycarbonate diol with a molecular weight $\overline{M}_n$ of 2000, and 40 to 20 parts by weight of a polydiol based on adipic acid, hexane diol and neopentyl glycol with a molecular weight $\overline{M}_n$ of 2000. Moreover, the mixture contains 1,6-hexamethylene diisocyanate in an equivalent ratio of 2.8:1.0 to 4.2:1.0, based on the polyol mixture, and butane 1,4-diol as chain extender, wherein the equivalent ratio of the butane 1,4-diol based on the polymixture is 1.3:1.0 to 3.3:1.0. These materials are characterised, inter alia, by a high tensile strength, tear strength and tear propagation resistance. EP-A-399 272 also discloses polyurethane films with good mechanical properties, particularly high ultimate tensile strength.

SUMMARY OF THE INVENTION

The object was, therefore, to develop materials with good light stability and thermal stability which have a lower mechanical strength than the well known thermoplastic polyurethanes. In addition, the materials obtained should, if necessary, also have improved tactile properties ("handle" or "feel") compared with pure TPU, and improved write resistance.

It has now been found that materials with good light stability and thermal stability which have a lower mechanical strength than the well known thermoplastic polyurethanes can be obtained by modifying light-stable thermoplastic polyurethanes with certain other components.

The invention provides, therefore, sinterable, thermoplastic moulding compositions containing a thermoplastic polyurethane based on an aliphatic diisocyanate and at least one other representative of the group comprising styrene-acrylonitrile copolymer (SAN), acrylonitrile-butadiene-styrene polymer (ABS), acrylonitrile-styrene-polyacrylate rubber moulding compound (ASA), copolymers of ethylene and/or propylene and acrylic acid or methacrylic acid or sodium or zinc salts thereof, and copolymers of ethylene and/or propylene and ester of acrylic or methacrylic acid, preferably methyl, ethyl or butyl ester, and UV stabilisers and antioxidants.

DETAILED DESCRIPTION OF THE INVENTION

The moulding compositions according to the invention preferably have an ultimate tensile strength at room temperature of not more than 20 N/mm$^2$, particularly preferably not more than 18 N/mm$^2$ and an elongation at break at room temperature of not more than 450%, particularly preferably not more than 400% (in each case measured in accordance with EN ISO 527-3/5 at tensile testing speed of 500 mm/min).

The ultimate tensile strength at −35° C. of the moulding compositions according to the invention is preferably not more than 35 N/mm$^2$, particularly preferably not more than 30 N/mm$^2$, and the elongation at break at −35° C. is not more than 250%, particularly preferably not more than 200% (in each case measured in accordance with EN ISO 527-3/2 at tensile testing speed of 500 mm/min).

The melt flow index (MVR) of the moulding compositions according to the invention, measured at 190° C. with a load of 2.16 kg (according to ISO 1133, method B), is preferably between 10 ml/10 min and 200 ml/10 min, particularly preferably between 20 ml/10 min and 150 ml/10 min.

Moreover, the low-temperature flexibility of the moulding compositions according to the invention is so high that the requirements of the falling ball test and the mandrel flex test at −50° C. are complied with without restriction.

In a preferred embodiment, the moulding compositions according to the invention contain 50 to 90 parts by wt. of thermoplastic polyurethane based on an aliphatic diisocyanate, 0 to 25 parts by wt. of ASA 0 to 30 parts by wt. of SAN 0 to 25 parts by wt. of ABS 0 to 25 parts by wt. of copolymers of ethylene and/or propylene and acrylic acid or methacrylic acid or sodium or zinc salts thereof, and copolymers of ethylene and/or propylene and acrylate or methacrylate or mixtures of said components UV stabilisers and antioxidants in a quantity from 0.2 to 5.0 wt. %, preferably 0.4 to 4.0 wt. %, based on the TPU, optionally other conventional auxiliaries and additives.

Examples for particularly preferred embodiments are moulding compositions which contain, per 100 parts by wt. of moulding compound, up to 30 parts by wt., particularly up to 20 parts by wt. of ASA.

In a further preferred embodiment, the moulding compositions according to the invention contain 70 to 90 parts by wt. of thermoplastic polyurethane based on an aliphatic diisocyanate, and 10 to 30 parts by wt. of SAN.

In a further preferred embodiment, the moulding compositions according to the invention contain 50 to 90 parts by wt. of thermoplastic polyurethane based on an aliphatic diisocyanate, and up to 30 parts by wt. of SAN, particularly up to 20 parts by wt. of SAN and additionally up to 20 parts by wt., particularly up to 15 parts by wt. of ASA, ABS, EMA (copolymer of ethylene and methyl acrylate) or EBA (copolymer of ethylene and butyl acrylate), per 100 parts by wt. of moulding compound.

With regard to the tactile properties ("dry handle"), the moulding compositions according to the invention are improved compared with pure TPU. The pure TPU has a waxy feel.

An improvement in the tactile properties is characterised in that the surface of the TPU moulding compound feels drier.

The write sensitivity of the moulding compositions according to the invention is similar to that of PVC (4N) or better (>4N).

The aliphatic, thermoplastic polyurethanes according to the invention may be obtained preferably from A) 100 to 60 mole %, preferably 100 to 70 mole %, particularly preferably 100 to 80 mole % of hexamethylene diisocyanate (HDI) and 0 to 40 mole %, preferably 0 to 30 mole %, particularly preferably 0 to 20 mole % of other aliphatic diisocyanates, B) polyester polyol with a number average molecular weight between 600 and 5000 g/mole, preferably 700 to 4200 g/mole, C) chain extender with an average molecular weight from 60 to 500 g/mole, D) optionally catalysts, wherein the equivalent ratio of diisocyanate A) to polyol B) is between 1.5:1.0 and 10.0:1.0 and wherein the NCO characteristic value (formed from the quotient, multiplied by 100, of the equivalent ratios of isocyanate groups and the sum of the hydroxyl groups of polyol and chain extender) is 95 to 105.

The following polyols may be used instead of the polyester polyol B):

polyether polyol with a number average molecular weight between 600 and 5000 g/mole, preferably between 700 and 4200 g/mole, polycarbonate diol with a number average molecular weight between 600 and 5000 g/mole, preferably between 700 and 4200 g/mole, polyether polyol/polyester polyol mixture with a number average molecular weight between 600 and 5000 g/mole, preferably between 700 and 4200 g/mole, polyether polyol/polycarbonate diol mixture with a number average molecular weight between 600 and 5000 g/mole, preferably between 700 and 4200 g/mole, polyester polyol/polycarbonate diol mixture with a number average molecular weight between 600 and 5000 g/mole, preferably between 700 and 4200 g/mole.

The polyol component used is preferably a mixture of 20 to 90 parts by wt. of a polyester adipate with a number average molecular weight from 500 to 4000 g/mole and 80 to 10 parts by wt. of a polyether polyol with a number average molecular weight from 1000 to 5000 g/mole.

The polyol component is composed particularly preferably of a mixture of 30 to 70 parts by wt. of a polyester adipate with a number average molecular weight from 500 to 4000 g/mole and 70 to 30 parts by wt. of a polyether polyol with a number average molecular weight from 1000 to 5000 g/mole.

If the proportion of polyester adipate in the polyol mixture is increased above 50% and if particular requirements are laid down in respect of hydrolysis, well known anti-hydrolysis agents (such as, e.g., carbodiimides) must be added to the polyester adipate.

The UV-stabilisers used are described by R. Gächter, H. Müller (Eds.) in Plastics Additives Handbook, 4$^{th}$ Edition, Hanser Verlag, Munich, 1993, Chapter 3 "Light Stabilisers" which is incorporated by reference.

The UV stabiliser used is particularly preferably a mixture of hindered amine stabilisers (HALS) and hydroxyphenyl-benzotriazoles.

The antioxidants used may be the conventional sterically hindered phenols. Further details can be obtained from R. Gächter, H. Müller (Eds.) in Plastics Additives Handbook, 4$^{th}$ Edition, Hanser Verlag, Munich 1993, Chapter 1 "Antioxidants", which is incorporated by reference.

Depending on the requirements in respect of the moulded part which is prepared from the TPU according to the invention, the hexamethylene diisocyanate (HDI) may be replaced partially by one or more other aliphatic diisocyanates, particularly isophorone diisocyanate (IPDI), 1,4-cyclolhexane diisocyanate, 1-methyl-2,4-cyclohexane diisocyanate, 1-methyl-2,6-cyclohexane diisocyanate and an isomer mixture thereof, 4,4'-, 2,4' and 2,2'-dicyclohexylmethane diisocyanate and an isomer mixture thereof.

Particularly preferred thermoplastic polyurethanes according to the invention are also those that may be obtained from A) 100 to 60 mole %, preferably 100 to 70 mole %, particularly preferably 100 to 80 mole % of hexamethylene diisocyanate (HDI) and 0 to 40 mole %, preferably 0 to 30 mole %, particularly preferably 0 to 20 mole % of other aliphatic diisocyanates, B) polyester polyol, polyether polyol, a mixture of polyether polyol and polyester polyol, a mixture of polyether polyol and polycarbonate diol or a mixture of polyester polyol and polycarbonate diol with a number average molecular weight in each case between 600 and 5000 g/mole.

C) 80 to 100 wt. % of hexane 1,6-diol and 0 to 20 wt. % of chain extender with an average molecular weight from 60 to 500 g/mole, D) optionally catalysts, wherein the equivalent ratio of diisocyanate A) to polyol B) is between 1.5:1.0 and 10.0:1.0 and wherein the NCO characteristic value (formed from the quotient, multiplied by 100, of the equivalent ratios of isocyanate groups and the sum of the hydroxyl groups of polyol and chain extender) is 95 to 105.

The organic diisocyanates A) used include aliphatic and cycloaliphatic diisocyanates as described e.g. in Justus Liebigs Annalen der Cliemie 562, p. 75–136. Examples include hexamethylene diisocyanate, isophorone diisocyanate, 1,4-cyclohexane diisocyanate, 1-methyl-2,4-cyclohexane diisocyanate and 1-methyl-2,6-cyclohexane diisocyanate and the corresponding isomer mixtures and 4,4'-, 2,4'- and 2,2'-dicyclohexylmethane diisocyanate and the corresponding isomer mixtures. The organic diisocyanate used is composed preferably of at least 50 wt. % of 1,6-hexamethylene diisocyanate.

In applications with less stringent requirements in respect of light stability, e.g. dark-coloured moulding compositions, at most 40 mol % of the aliphatic diisocyanate may be replaced by aromatic diisocyanates. These are likewise described in Justus Liebigs Annalen der Chemie 562, p. 75–136. Examples are toluene 2,4-diisocyanate, mixtures of toluene 2,4- and 2,6-diisocyanate, 4,4'-, 2,2'- and 2,4'-diphenylmethane diisocyanate, mixtures of 2,4- and 4,4'-diphenylmethane diisocyanate, urethane-modified liquid 2,4- and/or 4,4'-diphenylmethane diisocyanates, 4,4'-diisocyanatodiphenylethane (1,2) and 1,5-naphthylene diisocyanate.

Linear hydroxyl-terminated polyols with a number average molecular weight from 600 to 5000 are used as component B). Due to production conditions, these often contain small amounts of non-linear compounds. The term "substantially linear polyols" is often, therefore, also used. Polyesters and polycarbonate diols or mixtures thereof are preferred.

Suitable polyester diols may be prepared, for example, from dicarboxylic acids with 2 to 12 carbon atoms, preferably 4 to 6 carbon atoms, and polyhydric alcohols. Suitable dicarboxylic acids include: aliphatic dicarboxylic acids such as succinic acid, glutaric acid, adipic acid, suberic acid, azelaic acid and sebacic acid, and aromatic dicarboxylic acids such as phthalic acid, isophthalic acid and terephthalic acid. The dicarboxylic acids may be used individually or as mixtures, e.g. in the form of a succinic, glutaric and adipic acid mixture. In order to prepare the polyester diols it may optionally be advantageous to use the corresponding dicarboxylic acid derivatives instead of the dicarboxylic acids, such as carboxylic diesters with 1 to 4 carbon atoms in the alcohol radical, carboxylic anhydrides or carboxylic acid chlorides. Examples of polyhydric alcohols are glycols with 2 to 10, preferably 2 to 6 carbon atoms such as ethylene glycol, diethylene glycol, butane 1,4-diol, pentane 1,5-diol, hexane 1,6-diol, decane 1,10-diol, 2,2-dimethyl-1,3-propane diol, propane 1,3-diol and dipropylene glycol. Depending on the properties required, the polyhydric alcohols may be used by themselves or optionally in mixture. Esters of carbonic acid with the diols mentioned are also suitable, particularly those with 4 to 6 carbon atoms, such as butane 1,4-diol or hexane 1,6-diol, condensation products of hydroxycarboxylic acids, for example, hydroxycaproic acid and polymerisation products of lactones, for example, optionally substituted caprolactones. Polyester diols used in preference are ethane diol polyadipates, butane 1,4-diol polyadipates, ethane diol butane 1,4-diol polyadipates, hexane 1,6-diol neopentylglycol polyadipates, hexane 1,6-diol-butane-1,4-diol polyadipates and polycaprolactones. The polyester diols have molecular weights from 600 to 5000 and may be used individually or in the form of mixtures.

Suitable polyether diols may be prepared by reacting one or more alkylene oxides with 2 to 4 carbon atoms in the alkylene radical with a starter molecule which contains twvo active hydrogen atoms in bound form. Suitable alkylene oxides include: ethylene oxide, 1,2-propylene oxide, epichlorohydrin and 1,2-butylene oxide and 2,3-butylene oxide. Ethylene oxide, propylene oxide and mixtures of 1,2-propylene oxide and ethylene oxide are used in preference. The alkylene oxides may be used individually, in alternating succession or as mixtures. Suitable starter molecules include: water, aminoalcohols such as N-alkyl diethanolamines, for example, N-methyl diethanolamine, and diols such as ethylene glycol, 1,3-propylene glycol, butane 1,4-diol and hexane 1,6-diol. Optionally, mixtures of starter molecules may also be used. Suitable polyether diols are also the hydroxyl group-containing polymerisation products of tetrahydrofuran. Trifunctional polyethers may also be used in proportions from 0 to 30 wt. %, based on the bifunctional polyethers, but at most in a quantity such that a melt processable product is obtained. The substantially linear polyether diols have molecular weights from 1000 to 4000. They may be used both individually and in the form of mixtures.

Chain extenders C) used are aliphatic diols or diamines with a molecular weight from 60 to 500, preferably aliphatic diols with 2 to 14 carbon atoms, such as, e.g., ethane diol, hexane 1,6-diol, diethylene glycol, dipropylene glycol and in particular butane 1,4-diol, or (cyclo)aliphatic diamines such as, e.g., isophorone diamine, ethylene diamine, 1,2-propylene diamine, 1,3-propylene diamine, N-methylpropylene-1,3-diamine, N,N'-dimethylethylene diamine. Mixtures of the above-mentioned chain extenders may also be used. Relatively small amounts of triols may also be added.

In applications with less stringent requirements in respect of light stability, e.g. dark coloured moulding compositions, parts of the aliphatic diols and diamines may be replaced by aromatic diols and diamines. Examples of suitable aromatic diols are diesters of terephthalic acid with glycols with 2 to 4 carbon atoms such as, e.g., terephthalic acid-bis-ethylene glycol or terephthalic acid-bis-butane 1,4-diol, hydroxyalkylene ethers of hydroquinone such as, e.g., 1,4-(di) hydroxyethyl)hydroquinone and ethoxylated bisphenols. Examples of suitable aromatic diamines are 2,4-toluene diamine and 2,6-toluene diamine, 3,5-diethyl-2,4-toluene diamine and 3,5-diethyl-2,6-toluene diamine and primary mono-, di-, tri- or tetraalkylsubstituted 4,4'-diaminodiphenylmetlianes.

Conventional monofunctional compounds may also be used in small quantities, e.g., as chain terminators or mould release agents. Examples include alcohols such as octanol and stearyl alcohol or amines such as butylamine and stearylamine.

An aliphatic thermoplastic polyurethane used in particular preference for the preparation of the moulding compositions according to the invention is obtained by reaction of A) 100 to 60 mole %, preferably 100 to 70 mole %, particularly preferably 100 to 80 mole % of hexamethylene diisocyanate (HDI) and 0 to 40 mole %, preferably 0 to 30 mole %, particularly preferably 0 to 20 mole % of other aliphatic diisocyanates, B) polyester polyol, polyether polyol, a mixture of polyether polyol and polyester polyol, a mixture of polyether polyol and polycarbonate diol or a mixture of polyester polyol and polycarbonate diol with a number average molecular weight between 600 and 5000 g/mole in each case, C) 80 to 100 wt. % of hexane 1,6-diol and 0 to 20 wt. % of chain extender with an average molecular weight from 60 to 500 g/mole, D) optionally catalysts, and wherein the equivalent ratio of diisocyanate A) to polyol B) is between 1.5:1.0 and 10.0:1.0 and wherein the NCO characteristic value (formed from the quotient, multiplied by 100, of the equivalent ratios of isocyanate groups and the sum of the hydroxyl groups of polyol and chain extender) is 95 to 105.

A catalyst is used in preference in the continuous preparation of the thermoplastic polyurethanes according to the extruder or belt process. Suitable catalysts are conventional tertiary amines known from the state of the art such as, e.g., triethylamine, dimethyleyclohexylamine, N-methylmorpholine, N,N'-dimethylpiperazine, 2-(dimethylaminoethoxy)ethanol, diazabicyclo-[2,2,2]-octane and the like, and in particular organic metal compounds such as titanates, iron compounds, tin compounds, e.g. tin diacetate, tin dioctoate, tin dilaurate or the tin dialkyl salts of aliphatic carboxylic acids such as dibutyltin diacetate, dibutyltin dilaurate or the like. Preferred catalysts are organic metal compounds, particularly titanates, iron or tin compounds. Dibutyltin dilaurate is more particularly preferred.

Apart from the TPU components and optionally catalysts, auxiliaries and additives may also be added. Examples include lubricants such as fatty acid esters, the metal soaps thereof, fatty acid amides and silicone compounds, antiblocking agents, inhibitors, stabilisers against hydrolysis, light, heat and discoloration, flame retardants, colorants, pigments, inorganic and organic fillers and reinforcing agents which are produced according to the state of the art and may also be provided with a size. Further details about the auxiliaries and additives mentioned can be obtained from the technical literature, for example, J. H. Saunders, K. C. Frisch: "High Polymers", Vol. XVI, Polyurethane, Part 1 and 2, Interscienee Publishers 1962 and 1964, R. Gächter, H. M üller (Ed.): Taschenbuch der Kunststoff-Additive, 3rd edition, Hanser Verlag, Munich 1989 or DE-A-29 01 774.

The ASA component should be chosen such that the melt flow index MVR at 220° C. and 10 kg is between 3 and 40 ml/10 min, preferably between 3 and 30 ml/10 min.

The SAN component should be chosen such that the melt flow index MVR at 220° C. and 10 kg is between 5 and 80 m/10 min, preferably between 8 and 70 ml/10 min, particularly preferably between 15 and 70 ml/10 min.

The ABS component should be chosen such that the melt flow index MVR at 220° C. and 10 kg is between 3 and 50 ml/10 min, preferably between 3 and 30 ml/10 min.

The copolymers of ethylene and/or propylene and acrylic acid or methacrylic acid or sodium or zinc salts thereof, and copolymers of ethylene and/or propylene and acrylate or methacrylate or mixtures of all these components should have a melt flow index MVR at 190° C. and 2.16 kg between 2 ml/10 min and 350 ml/10 min, preferably between 2 ml/10 min and 200 ml/10 min.

TPU based on aliphatic diisocyanates which already have a sufficiently low mechanical strength in view of their composition are usually unsuitable as a cover for airbags in the instrument panel area because of the undesirable tactile properties and/or insufficient write resistance. They are also unsuitable for instrument panels in motor vehicles with an invisible passenger airbag.

The write resistance and the tactile properties may be markedly improved even in these TPUs whilst retaining the necessary low mechanical strength by the addition of the ASA, SAN, ABS described and/or copolymers described.

The moulding compositions according to the invention may be prepared by mixing the TPU granules prepared according to processes known in principle with the relevant additives and compounding by reextrusion in a manner known to the expert. The moulding compound obtained may then be pelletised and converted to a sinterable powder by cold grinding, which powder is suitable for processing by the powder-slush process. Such powders preferably have particle sizes from 50 to 500 $\mu$m.

The moulding compositions according to the invention are suitable for the preparation of various moulded articles, for example, films, particularly textured films. In the form of a powder, the polyurethane moulding compound according to the invention may be formed to skins in heated moulds by the well known powder-slush process. The powder required therefor is obtained from the pellets of the polyurethane moulding compound according to the invention by cold grinding. The ground product is introduced into a heated mould open on one side, by repeated rotating a closed skin is produced. After the mould has cooled, the slush skin may be removed. The process is similar, therefore, to that of the preparation of dashboard coverings made of PVC skins. It is described, for example, as a powder-slush process in DE-A 39 32 923.

In view of the well defined melting point and the presence of a melt with a low viscosity even from the melting point onwards, the powder sinters on the inner walls of the heated mould within a short period to form a homogeneous film free from small holes and bubbles which can be removed from the mould without warpage after cooling to only 100° C. due to the high propensity to crystallisation of the moulding compound according to the invention. These factors make the sintering process with the moulding compound according to the invention particularly economic.

The film prepared from this polyurethane moulding compound has a soft and leather-like feel and does not tend to change its gloss even under the influence of light. The grain pattern does not change during hot air ageing (110 to 120° C.); similarly, no change occurs during heat ageing by storage on a grating at 20° C.

The films prepared from the polyurethane moulding compositions according to the invention are suitable, for example, for use as trim in means of transport, e.g. aeroplanes, ships, trains or motor vehicles, particularly as trim for instrument panels and as a cover for airbags, because the films adhere outstandingly well to the polyurethane foam backing of the instrument panel. The present invention also provides, therefore, the use of the films according to the invention as trim for instrument panels, door trim, door sills, gear lever gaiters in means of transport, particularly in motor vehicles.

The invention will be explained in more detail on the basis of the following examples.

EXAMPLES

Preparation of TPU (Thermoplastic Polyurethanes)

The TPUs were prepared continuously as follows:

The mixture of polyol B), chain extender C) and dibutyltin dilaurate was heated to about 110° C. in a reactor with stirring and, together with the corresponding diisocyanate which was heated to about 110° C. by means of a heat exchanger, intensively mixed by a static mixer from Sulzer (DN6 with 10 mixing elements and a shear rate of 500 s$^{-1}$) and then fed to the feed section of a screw (ZSK 32).

The second diisocyanate, IPDI, was fed into the first zone of the screw (ZSK 32). The entire mixture reacted on the extruder until conversion was complete and was then pelletised.

Composition of the TPU (thermoplastic polyurethanes):

| TPU | HDI mole/g | IPDI mole/g | HPI/IPDI mole % mole % | DE2020 mole/g | PE225B mole/g | Acclaim 2220 | 1,4 BDO mole/g | 1,6 HDO mole/g | DBTL ppm |
|---|---|---|---|---|---|---|---|---|---|
| 1 | 5.09/855 | — | 100/0 | 1.0/2000 | 0.43/967 | — | 3.76/339 | — | 40 |
| 2 | 3.7/622 | — | 100/0 | — | 1.0/2250 | — | 2.7/243 | — | 40 |
| 3 | 5.34/898 | 0.59/131 | 90/10 | 1.0/2000 | 0.43/967 | — | — | 4.5/532 | 120 |
| 4 | 4.42/743 | — | 100/0 | 1.0/2000 | 0.43/967 | — | — | 2.99/353 | 40 |
| 5 | 4.86/817 | — | 100/0 | — | 1.0/2250 | 0.43/860 | — | 3.43/405 | 60 |

The quantities of DBTL are based on the polyol mixture.

The TPU 2 and 5 contain, in addition, the following additives:

| TPU | |
|---|---|
| 2 | 1.0 wt. % of Stabaxol P200 (based on PE 225B) |
| 5 | 1.0 wt. % of Stabaxol P200 (based on PE225B) 0.5 wt. % Irganox 1010 (based on TPU) |

| | |
|---|---|
| DBTL: | dibutyltin dilaurate |
| DE2020: | polycarbonate diol based on hexane 1,6-diol with an average molecular weight $\overline{M}_n$ = 2250 g/mole |
| PE 225B: | polybutane diol adipate with an average molecular weight $\overline{M}_n$ = 2250 g/mole |
| 1,4BDO: | butane 1,4-diol |
| HDI: | hexamethylene diisocyanate |
| IPDI: | isophorone diisocyanate |
| Irganox ® 1010: | tetrakis[methylene-(3,5-di-tert.butyl-4-hydroxyhydrocinnamate)]-methane (Ciba-Geigy) |
| Irganox ® 245: | ethylenebis(oxyethylene)bis-(3-tert.butyl-4-hydroxy-5-methylhydro-cinnamate) (Ciba-Geigy) |
| 1,6HDO: | hexane 1,6-diol |
| Tinuvin ® 328: | 2-(2'-hydroxy-3'-5'-di-tert.amylphenyl) benzotriazole (Ciba-Geigy) |
| Tinuvin ® 622: | dimethylsuccinate polymer with 4-hydroxy-2,2,6,6-tetra-methyl-1-piperidine ethanol (Ciba Geigy) |
| Loxiol ® G78: | stearic acid (Hoechst) |
| Acclaim ® 2220: | polyether polyol with polyoxypropylene-polyoxyethylene units (with about 85% primary hydroxyl groups and an average molecular weight of $M_n$ 2000 g/mole (Lyondell) |
| Stabaxol ® P200: | aromatic polycarbodiimide (Rhein-Chemie) |

Compounding

The TPUs were compounded with the other components on an extruder of the DSE 25, 4Z, 360 Nm type, with the following structure:

1. Feed zone (40° C.)
2. First heating zone (160° C.) with kneading zone
3. Second heating zone (165° C.) with conveying elements and kneading zone
4. Third heating zone (170° C.) with kneading zone, conveying elements and vacuum degassing
6. Crosshead (185° C.) and die (180° C.)
5. Fourth heating zone (175° C.) with conveying elements The TPU and the other components were introduced gravimetrically, a throughput of 8 kg/h being obtained. Compounding took place in one step at a screw speed of 180 min$^{-1}$. The strand emerging from the extruder was processed by pelletisation to cylindrical pellets about 2 mm long and then dried for 1 h at 60° C. in a vacuum drying cabinet.

The components to be compounded may be metered in various ways:

a) The premixed granules, additives in powder form (stabilisers, pigments) and liquid components (e.g. UV stabilisers) are introduced into the feed zone by way of separate gravimetric metering operations;

b) like a) but liquid components are fed by way of a lateral metering device;

c) all the components are premixed in a heated mixer at 90° C. The liquid components diffuse into the granules, during which process components in powder form adhere to the granules. A dry premix capable of being conveyed is obtained in this way, which may be introduced into the extruder by way of a metering device.

After compounding and pelletising, the material was cold ground on a baffle plate impact mill or disc mill cooled with liquid nitrogen. A powder with an average particle diameter of <500 μm was obtained.

Comparison 1

TPU 1 was mixed in a compounding stage with standard pigments (2% Elftex® 435 from Cabod), UV stabiliser (Tinuvin® 328 and 622), antioxidant (Irganox® 245) and release agent (Loxiol® G78), reextruded, pelletised and then ground to a fine powder with a particle size distribution from 50 to 500 μm, with cooling with liquid nitrogen.

Comparison 2 to 5

The comparative tests 2 to 5 were carried out in the same way as comparative test 1 with the relevant TPU 2 to 5.

Example 1

85 parts by wt. of TPU 1 were compounded with 15 parts by wt. of ASA (acrylonitrile content 22%, styrene content 58%, polyacrylate rubber content 20%, MVR (220° C. 10 kg) 28 ml/10 min) together with standard pigments (2% Elftex® 435 from Cabod), UV stabiliser (Tinuvin® 328 and 622), antioxidant (Irganox® 245) and release agent (Loxiol® G78).

Example 2

85 parts by wt. of TPU 2 were compounded with 15 parts by wt. of ASA (acrylonitrile content 22 wt. %, styrene content 58 wt. %, polyacrylate rubber content 20 wt. %, MVR (220° C. 10 kg) 28 ml/10 min) together with standard pigment (2% Elftex® 435 from Cabod), UV stabiliser (Tinuvin® 328 and 622), antioxidant (Irganox® 245) and release agent (Loxiol® G78).

Example 3

80 parts by wt. of TPU 2 were compounded with 20 parts by wt. of ABS (acrylonitrile content 23 wt. %, butadiene content 32 wt. %, styrene content 45 'wt. %, MVR (220° C. 10 kg) 6 ml/10 min) together with standard pigment (2% Elftex® 435 from Cabod), UV stabiliser (Tinuvin® 328 and 622), antioxidant (Irganox® 245) and release agent (Loxiol® G78).

Example 4

70 parts by wt. of TPU 2 were compounded with 30 parts by wt. of SAN (MVR 220° C., 10 kg) 60 ml/10 min; 30 wt. % acrylonitrile content, 70 wt. % styrene content) together with standard pigments (2% Elfex® 435 from Cabod), UV stabiliser (Tinuvin® 328), antioxidant (Irganox® 245) and release agent (Loxiol® G78).

Example 5

75 parts by wt. of TPU 2 were compounded with 15 parts by wt. of ASA (acrylonitrile content 22 wt. %, styrene content 58 wt. %, polyacrylate rubber content 20 wt. %, MVR (220° C. 10 kg) 28 ml/10 min) and 10 parts by wt. of EMA (24 wt. % methyl ester content, MVR (190° C., 2.16 kg) 6 ml/10 min) together with standard pigment (2% Elftex® 435 from Cabod), UV stabiliser (Tinuvin® 328), antioxidant (Irganox® 245) and release agent (Loxiol® G78).

Example 6

70 parts by wt. of TPU 2 were compounded with 15 parts by wt. of SAN (acrylonitrile content 22 wt. %, styrene content 58 wt. %, polyacrylate rubber content 20wt. %, MVR (220° C. 10 kg) 28 ml/10 min) and 15 parts by wt. of SAN (acrylonitrile content 30%, styrene content 70%, MVR (220° C., 10 kg) 60 ml/10 min) together with standard pigment (2% Elftex® 435 from Cabod), UV stabiliser (Tinuvin® 328), antioxidant (Irganox® 245) and release agent (Loxiol® G78).

Example 7

80 parts by wt. of TPU 2 were compounded with 20 parts by wt. of EMA (24 wt. % methyl ester content, MVR (190° C., 2.16 kg) 6 ml/10 min) together with standard pigment (2% Elflex® 435 from Cabod), UV stabiliser (Tinuvin® 328), antioxidant (Irganox® 245) and release agent (Loxiol® G78).

Example 8

80 parts by wt. of TPU 2 were compounded with 15 parts by wt. of ASA (acrylonitrile content 22 wt. %, styrene content 58 wt. %, polyacrylate rubber content 20 wt. %, MVR (220° C. 10 kg) 28 ml/10 min) and 5 parts by wt. of PMMA (Lucryl® G55, BASF AG) together with standard pigment (2% Elftex® 435 from Cabod), UV stabiliser (Tinuvin® 328), antioxidant (Irganox® 245) and release agent (Loxiol® G78).

Example 9

85 parts by wt. of TPU 3 were compounded with 15 parts by wt. of ASA (acrylonitrile content 22 wt. %, styrene content 58 wt. %, polyacrylate rubber content 20 wt. % MVR (220° C., 10 kg) 28 ml/10 min) together with standard pigments (2% Elftex® 435 from Cabod), UV stabiliser (Tinuvin® 328 and 622), antioxidant (Irganox® 245) and release agent (Loxiol® G78).

Example 10

85 parts by wt. of TPU 4 were compounded with 15 parts by wt. of ASA (acrylonitrile content 22 wt. %, styrene content 58 wt. %, polyacrylate rubber content 20 wt. % MVR (220° C., 10 kg) 28 ml/10 min) together with standard pigments (2% Elftex® 435 from Cabod), UV stabiliser (Tinuvin®) 328 and 622), antioxidant (Irganox(® 245) and release agent (Loxiol® G78).

Example 11

90 parts by wt. of TPU 5 were compounded with 10 parts by wt. of ASA (acrylonitrile content 22 wt. %, styrene content 58 wt. %, polyacrylate rubber content 20 wt. % MVR (220° C., 10 kg) 28 ml/10 min) together with standard pigments (2% Elftex® 435 from Cabod), UV stabiliser (Tinuvin® 328 and 622), antioxidant (Irganox(® 245) and release agent (Loxiol® G78).

The pellets obtained in the examples were ground to a fine powder with a particle size distribution from 50 to 400 μm with cooling with liquid nitrogen.

In order to prepare test specimens, the powders were slushed to rings in a heated cylinder with a diameter of 21 cm and a height of 15 cm. With an average filling quantity of about 80 g of these TPU powders, slush rings about 0.8 mm thick were obtained.

The following measurements were carried out on the materials obtained in the examples:

- Ultimate tensile strength and elongation at break at room temperature according to EN ISO 527-3/5, but with a tensile testing speed of 500 mm/min
- Ultimate tensile strength and elongation at break at −35° C. according to EN ISO 527-3/2
- Fogging (3 h/100° C.) according to DIN 75201A
- Condensate (16 h/120° C.) similar to DIN 75201B
- MVR at 190° C. and 2.16 kg according to ISO 1133 method B
- Light fastness (5 cycles) according to DIN 75202, where, with a scale of assessment from 1 to 5, a high number corresponds to good resistance to UV light
- Heat ageing (500 h/120° C.), suspended in a circulating air drying cabinet with ±2° C. tolerance.

Falling ball test: The test specimens are stored at −50° C. for 24 hours. A test layout according to DBL 5306 is used for the falling ball test. In this test, a solid steel ball drops from a height of 230 mm onto a steel plate. The test shall be deemed passed if no damage has occurred to the test specimen.

Mandrel flex test: After storage for one hour at −50° C. a test specimen about 50 mm wide and 100 mm long is bent completely round a mandrel with a diameter of 20 mm. The test shall be deemed passed if the test specimen exhibits neither stress-whitening nor cracks.

Write sensitivity: In order to determine the write sensitivity, an Erichsen rod 318 with an engraving nib no. 1 with a radius of 0.4 mm and a spring with an elastic force between 1 N and 10 N is placed in a Crockimeter. The Crockmeter ami is additionally loaded with a weight of 10 n. The desired elastic force is adjusted with the slide of the Erichsen rod 318. The Erichsen rod 318 is then pulled perpendicularly using the Crockmeter arm about 100 mm above the test specimen which is situated on a hard support. The write sensitivity is assessed by means of the elastic force required to generate a visible surface change on the test specimen without damaging the surface. A high force to be applied to achieve the writing mark corresponds to a high write resistance.

The results of the measurements are summarised in the Table below.

|  | Comparison 1 | Comparison 2 | Comparison 3 | Comparison 4 | Comparison 5 | Example 1 | Example 2 | Example 3 |
|---|---|---|---|---|---|---|---|---|
| Ultimate tensile strength [MPa] | 33 | 25 | 24 | 22 | 19 | 20 | 13 | 18 |
| Elongation at break [%] | 742 | 780 | 730 | 770 | 770 | 450 | 300 | 390 |
| Ultimate tensile strength [MPa] −35° C. | 50 | 35 | 40 | 34 | 32 | 32 | 35 | 26 |
| Elongation at break [%] −35° C. | 356 | 450 | 350 | 380 | 360 | 200 | 200 | 250 |
| Ultimate tensile strength [MPa] 85° C. | 12 |  |  |  |  |  | 3 |  |
| Elongation at break [%] 85° C. | 600 |  |  |  |  |  | 240 |  |
| Falling ball test −50° C. | pass | pass | pass | pass | pass | pass | pass | pass |
| Mandrel flex test −50° C. | pass | pass | pass | pass | pass | pass | pass | pass |
| Shore hardness A | 92 | 85 | 89 | 88 | 88 | 92 | 87 | 91 |
| Write sensitivity | 4 | 2 | 1 | 1 | 1 | 6 | 5 |  |
| MVR | 38 | 42 | 48 | 51 | 67 | 39 | 43 | 27 |
| Tactile properties | fail | fail | fail | fail | fail | pass | pass | pass |
| Light fastness | 4–5 | 4 | 4–5 | 4–5 | 4–5 | 4–5 | 4–5 | 4–5 |
| Ultimate tensile strength [MPa] after 500 h 120° C. | 33 | 22 | 21 | 19 |  | 20 | 14 |  |
| Elongation at break [%] after 500 h, 120° C. | 720 | 730 | 630 | 660 |  | 480 | 314 |  |
| Fogging [%] | 92 | 96 | 96 | 97 |  | 97 | 96 | 92 |
| Condensate [mg] 120° C. | 3.3 | 1.7 | 2.6 | 2.7 | 2.8 | 2.8 | 2.5 | 2.7 |

|  | Example 4 | Example 5 | Example 6 | Example 7 | Example 8 | Example 9 | Example 10 | Example 11 |
|---|---|---|---|---|---|---|---|---|
| Ultimate tensile strength [MPa] | 13 | 18 | 14 | 17 | 14 | 12 | 12 | 11 |
| Elongation at break [%] | 290 | 400 | 390 | 394 | 360 | 140 | 190 | 250 |
| Ultimate tensile strength [MPa] −35° C. | 30 | 30 | 35 | 27 | 25 | 25 | 27 | 27 |
| Elongation at break [%] −35° C. | 185 | 200 | 150 | 250 | 170 | 120 | 160 | 193 |
| Ultimate tensile strength [MPa] 85° C. |  |  |  | 3 |  |  |  |  |
| Elongation at break [%] 85° C. |  |  |  | 370 |  |  |  |  |
| Falling ball test −50° C. | pass | pass | pass | pass | pass | pass | pass | pass |
| Mandrel flex test −50° C. | pass | pass | pass | pass | pass | pass | pass | pass |
| Shore hardness A | 89 | 89 | 87 | 88 | 89 | 90 | 91 | 91 |
| Write sensitivity |  | 4 |  |  |  | 4 | 4 | 5 |
| MVR | 32 | 35 | 47 | 31 | 38 | 45 | 45 | 54 |
| Tactile properties | pass |  | pass |  | pass | pass | pass | pass |
| Light fastness | 4 | 4 | 4–5 | 4 | 4 | 4–5 | 4 | 4–5 |
| Ultimate tensile strength [MPa] after 500 h 120° C. |  |  |  |  |  |  |  |  |
| Elongation at break [%] after 500 h, 120° C. |  |  |  |  |  |  |  |  |
| Fogging [%] | 98 | 96 | 98 | 97 | 98 | 93 | 95 | 92 |
| Condensate [mg] 120° C. | 2.2 | 2.6 | 3.0 | 1.8 | 2.3 | 1.9 | 1.9 | 2.0 |

What is claimed is:

1. A thermoplastic molding composition in the form of sinterable powder consisting of:
(i) a resinous blend of (a) thermoplastic polyurethane the diisocyanate reactant used in its preparation is one of aliphatic and cycloaliphatic, and (b) at least one member selected from the group consisting of acrylonitrile-styrene-polyacrylate rubber,
copolymer of ethylene and acrylic acid,
copolymer of ethylene and methacrylic acid,
copolymer of ethylene and sodium salt of acrylic acid,
copolymer of ethylene and sodium salt of methacrylic acid,
copolymer of ethylene and zinc salt of acrylic acid,
copolymer of ethylene and zinc salt of methacrylic acid,
copolymer of ethylene and ester of acrylic acid,
copolymer of ethylene and ester of methacrylic acid,
copolymer of propylene and acrylic acid,
copolymer of propylene and methacrylic acid,
copolymer of propylene and sodium salt of acrylic acid,
copolymer of propylene and sodium salt of methacrylic acid,
copolymer of propylene and zinc salt of acrylic acid,
copolymer of propylene and zinc salt of methacrylic acid, copolymer of propylene and ester of acrylic acid,
copolymer of propylene and ester of methacrylic acid,
copolymer of ethylene, propylene and acrylic acid,
copolymer of ethylene, propylene and methacrylic acid,
copolymer of ethylene, propylene and sodium salt of acrylic acid,
copolymer of ethylene, propylene and sodium salt of methacrylic acid,
copolymer of ethylene, propylene and zinc salt of acrylic acid,
copolymer of ethylene, propylene and zinc salt of methacrylic acid,
copolymer of ethylene, propylene and ester of acrylic acid, and
copolymer of ethylene, propylene and ester of methacrylic acid;
(ii) a UV stabilizer; and
(iii) an antioxidant.

2. The molding composition of claim 1 wherein it has an ultimate tensile strength value at room temperature of not more than 20 N/mm², and an elongation at break value at room temperature of not more than 450%, both determined in accordance with EN ISO 527-3/5 at a tensile testing speed of 500 mm/min.

3. The molding composition of claim 2 wherein it has an ultimate tensile strength value at −35° C. of not more than 35 N/mm², and an elongation at break value at −35° C. of not more than 250%, both determined in accordance with EN ISO 527-3/5 at a tensile testing speed of 500 mm/min.

4. The molding composition of claim 1 wherein said molding composition has improved tactile properties relative of a molding composition consisting of said thermoplastic polyurethane (a) alone.

5. The molding composition of claim 1, wherein (b) is acrylonitrile-styrene-polyacrylate rubber, said molding composition having improved write resistance relative to a molding composition consisting of said thermoplastic polyurethane (a) alone.

6. A thermoplastic molding composition in the form of sinterable powder consisting of:
(i) a resinous blend containing (a) 50 to 90 parts by weight of thermoplastic polyurethane the diisocyanate reactant used in its preparation is aliphatic, and (b) at least one member selected from a first group consisting of
0 to 25 parts by weight of acrylonitrile-styrene-polyacrylate rubber, and
0 to 25 parts by weight of at least one member selected from a second group consisting of copolymer of ethylene and acrylic acid,
copolymer of ethylene and methacrylic acid,
copolymer of ethylene and sodium salt of acrylic acid,
copolymer of ethylene and sodium salt of methacrylic acid,
copolymer of ethylene and zinc salt of acrylic acid,
copolymer of ethylene and zinc salt of methacrylic acid,
copolymer of ethylene and ester of acrylic acid,
copolymer of ethylene and ester of methacrylic acid,
copolymer of propylene and acrylic acid,
copolymer of propylene and methacrylic acid,
copolymer of propylene and sodium salt of acrylic acid,
copolymer of propylene and sodium salt of methacrylic acid,
copolymer of propylene and zinc salt of acrylic acid,
copolymer of propylene and zinc salt of methacrylic acid,
copolymer of propylene and ester of acrylic acid,
copolymer of propylene and ester of methacrylic acid,
copolymer of ethylene, propylene and acrylic acid,
copolymer of ethylene, propylene and methacrylic acid,
copolymer of ethylene, propylene and sodium salt of acrylic acid,
copolymer of ethylene, propylene and sodium salt of methacrylic acid,
copolymer of ethylene, propylene and zinc salt of acrylic acid,
copolymer of ethylene, propylene and zinc salt of methacrylic acid,
copolymer of ethylene, propylene and ester of acrylic acid, and
copolymer of ethylene, propylene and ester of methacrylic acid;
(ii) a UV stabilizer; and
(iii) an antioxidant,
wherein the total amount of said (ii) and (iii) is about 0.2 to 5.0 percent relative to the weight of the thermoplastic polyurethane (a).

7. The molding composition of claim 1, wherein said polyurethane (a) is a product of reacting,
(A) 100 to 60% of hexamethylene diisocyanate and 0 to 40% of another aliphatic diisocyanate, said percent, both occurrences, being relative to the moles of diisocyanate,
(B) polyester polyol having a number average molecular weight of 600 to 5000 g/mole, and
(C) at least one chain extender having an average molecular weight of 60 to 500 g/mole, in the presence of an optional
(D) catalyst,
wherein the equivalent ratio of (A) to (B) is about 1.5:1.0 to 10.0:1.0, and the NCO characteristic values is 95 to 105.

8. The molding composition of claim 1, wherein said polyurethane (a) is a product of reacting,
(A) 100 to 60% of hexamethylene diisocyanate and 0 to 40% of another aliphatic diisocyanate, said percent, both occurrences, being relative to the moles of diisocyanate,
(B) polyether polyol having a number average molecular weight of 600 to 5000 g/mole, and
(C) at least one chain extender having an average molecular weight of 60 to 500 g/mole, in the presence of an optional
(D) catalyst,
wherein the equivalent ratio of (A) to (B) is about 1.5:1.0 to 10.0:1.0, wherein the NCO characteristic value is 95 to 105.

9. The molding composition of claim 1, wherein said polyurethane (a) is a product of reacting,
(A) 100 to 60% of hexamethylene diisocyanate and 0 to 40% of another aliphatic diisocyanate, said percent, both occurrences, being relative to the moles of diisocyanate,
(B) a mixture of polyether polyol and polyester polyol, each having a number average molecular weight of 600 to 5000 g/mole, and
(C) at least one chain extender having an average molecular weight of 60 to 500 g/mole, in the presence of an optional
(D) catalyst,
wherein the equivalent ratio of (A) to (B) is about 1.5:1.0 to 10.0:1.0, and the NCO characteristic value is 95 to 105.

10. The molding composition of claim 1, wherein said polyurethane (a) is a product of reacting,
- (A) 100 to 60% of hexamethylene diisocyanate and 0 to 40% of another aliphatic diisocyanate, said percent, both occurrences, being relative to the moles of diisocyanate,
- (B) a mixture of polyether polyol and polycarbonate diol, each having a number average molecular weight of 500 to 5000 g/mole, and
- (C) at least one chain extender having an average molecular weight of 60 to 600 g/mole, in the presence of an optional
- (D) catalyst, wherein the equivalent ratio of (A) to (B) is about 1.5:1.0 to 10.0:1.0, and the NCO characteristic value is 95 to 105.

11. The molding composition of claim 1, wherein said polyurethane (a) is a product of reacting,
- (A) 100 to 60% of hexamethylene diisocyanate and 0 to 40% of another aliphatic diisocyanate, said percent, both occurrences, being relative to the moles of diisocyanate,
- (B) a mixture of polyester polyol and polycarbonate diol, each having a number average molecular weight of 600 to 5000 g/mole, and
- (C) at least one chain extender having an average molecular weight of 60 to 500 g/mole, in the presence of an optional
- (D) catalyst, wherein the equivalent ratio of (A) to (B) is about 1.5:1.0 to 10.0:1.0, and the NCO characteristic value is 95 to 105.

12. The molding composition of claim 1, wherein said polyurethane (a) is a product of reacting,
- (A) 100 to 60% of hexamethylene diisocyanate and 0 to 40% of another aliphatic diisocyanate, said percent, both occurrences, being relative to the moles of diisocyanate,
- (B) polycarbonate diol having a number average molecular weight of 600 to 5000 g/mole, and
- (C) at least one chain extender having an average molecular weight of 60 to 500 g/mole, in the presence of an optional
- (D) catalyst, wherein the equivalent ratio of (A) to (B) is about 1.5:1.0 to 10.0:1.0, and the NCO characteristic value is 95 to 105.

13. The molding composition of claim 1, wherein said polyurethane (a) is a product of reacting,
- (A) 100 to 60% of hexamethylene diisocyanate and 0 to 40% of another aliphatic diisocyanate, said percent, both occurrences, being relative to the moles of diisocyanate,
- (B) at least one member selected from the group consisting of polyester polyol, polyether polyol, a mixture of polyether polyol and polycarbonate diol, a mixture of polyester polyol and polycarbonate diol, each having a number average molecular weight of 600 to 5000 g/mole, and
- (C) 80 to 100% of hexane, 1,6-diol and 0 to 20% of another chain extender having an average molecular weight of 60 to 500 g/mole, said % both occurrences being relative to the weight of said (C), in the presence of an optional
- (D) catalyst, wherein the equivalent ratio of (A) to (B) is about 1.5:1.0 to 10.0:1.0, and the NCO characteristic value is 95 to 105.

14. A molded article prepared by powder slush molding of the composition of claim 1.

15. A method of using the composition of claim 1, comprising molding an automotive trim.

16. The molding composition of claim 1, wherein said composition has a weight average particle size of 50 to 500 microns.

* * * * *